United States Patent [19]

Blenkush

[11] Patent Number: 4,703,957
[45] Date of Patent: Nov. 3, 1987

[54] MINIATURE TUBE FITTING HAVING A BARBED STEM PORTION SURROUNDED BY A PROTECTIVE SHROUD AND METHOD FOR MAKING SAME

[75] Inventor: Brian J. Blenkush, Maple Grove, Minn.

[73] Assignee: Colder Products Company, St. Paul, Minn.

[21] Appl. No.: 818,245

[22] Filed: Jan. 13, 1986

Related U.S. Application Data

[63] Continuation-in-part of Ser. No. 658,271, Oct. 5, 1984, Pat. No. 4,630,847.

[51] Int. Cl.$^4$ ............................................. F16L 33/00
[52] U.S. Cl. ...................................... 285/239; 285/93; 249/145; 249/184; 425/577
[58] Field of Search ................. 285/93, 121, 122, 123, 285/124, 125, 126, 127, 239, 423, 137.1; 264/318; 249/145, 184; 425/577

[56] References Cited

U.S. PATENT DOCUMENTS

| 595,927 | 12/1897 | Temple | 285/239 |
|---|---|---|---|
| 1,994,784 | 3/1935 | Porzel | 285/239 |
| 2,347,773 | 5/1944 | Franz | 249/145 |
| 2,688,498 | 9/1954 | Wilson | 285/93 |
| 2,911,458 | 11/1959 | McKee | 285/121 |
| 2,956,819 | 10/1960 | Sies | 285/93 |
| 2,994,921 | 8/1961 | Hultgreen | 425/577 |
| 3,281,514 | 10/1966 | Polka | 425/577 |
| 3,905,416 | 9/1975 | Hammer | 264/318 |
| 4,378,103 | 3/1983 | Sanford et al. | 249/145 |

FOREIGN PATENT DOCUMENTS

| 734307 | 5/1966 | Canada | 285/423 |
|---|---|---|---|
| 22568 | 6/1948 | Finland | 285/93 |
| 25557 | 3/1976 | Japan | 264/318 |
| 74732 | 3/1949 | Norway | 285/239 |

OTHER PUBLICATIONS

Brochure entitled "Miniature Plastic Fittings", by Value Plastics, Inc., Ft. Collins, Colorado; Apr. 9, 1984.
Brochure entitled "Miniature Plastic Fittings and Accessories", by Ark-Plas Products, Inc., Flippin, AR; 10/85.
Brochure entitled "High Quality Microminiature Molded Fittings for Instrumentation and Control Circuits", by Swiss Connection Inc., Golden, Colorado.
Capline Connector sketch dated Feb. 9, 1979 with notation as corrected Jun. 11, 1979.
Hercudet Capline Connector Assembly drawing drawn on Jun. 14, 1979.
Hercules's Capline Connector sketch dated Apr. 5, 1984.

*Primary Examiner*—Cornelius J. Husar
*Assistant Examiner*—Anthony Knight
*Attorney, Agent, or Firm*—Merchant, Gould, Smith, Edell, Welter & Schmidt

[57] ABSTRACT

A molded miniature tube fitting (200) having a barbed stem portion (204) surrounded by a protective shroud (206) and method for making same. The shroud (206) including windows (230) therein so as to enable undercutting of a portion of the stem portion (204) so as to form a barb (224).

12 Claims, 18 Drawing Figures

MINIATURE TUBE FITTING HAVING A BARBED STEM PORTION SURROUNDED BY A PROTECTIVE SHROUD AND METHOD FOR MAKING SAME

This application is a continuation-in-part of Ser. No. 658,271 filed Oct. 5, 1984 now U.S. Pat. No. 4,630,847.

BACKGROUND OF THE INVENTION

The present invention relates to a molded miniature tube fitting having a barbed stem portion surrounded by a protective shroud and a method for making same. More particularly, the present invention relates to a miniature tube fitting having a barbed stem portion surrounded by a protective shroud and method for making same wherein the fitting includes a tapered stem portion encircled by the protective shroud, the shroud including openings, also referred to as windows, which allow a sharp undercut to be formed during the molding process behind the tapered stem portion so that the tapered stem portion is provided with a sharp barbed edge for gripping the tubing inserted over the tapered stem portion.

It is well-known to mold miniature tube fittings from a thermoplastic material. However, a common problem encountered by users of miniature tube fittings, particularly tube diameters in the range of 1/16 inch, has been breakage and kinking of the small stem portions. This is a frequent occurrence because of the limitation in the actual size of the stem portion and the strength of the plastic material used in producing the fittings.

Moreover, there is the problem of how to form a stem portion which is surrounded by a shroud, with a sharp barbed edge for effectively gripping the tubing inserted over the stem portion.

The present invention solves these problems and many others by providing a molded miniature tube fitting which has a barbed stem portion surrounded by a protective shroud and method for making same.

SUMMARY OF THE INVENTION

The present invention relates to a molded miniature tube fitting having a stem portion including a tapered stem portion at least partially encircled by a shroud portion spaced radially outward from the stem portion. The shroud portion includes two spaced-apart apertures which enable an undercut to be formed in the stem portion during a molding process whereby the stem portion is provided with a sharp barb for effectively gripping tubing inserted thereover.

The present invention further relates to a method for making a miniature tube fitting having a stem portion including a tapered stem portion at least partially encircled by a shroud portion spaced radially outward from the stem portion. The method includes the step of forming a sharp barb along the stem portion by inserting mold elements through window openings in the shroud portion so as to undercut the stem portion.

One advantage of the tube fitting having a shrouded, stem portion is that the shroud provides external support of the tubing outside diameter which restricts the side movement of the stem portion when a side tensile pull is exerted. The shroud also provides added protection of the stem portion when tubing is not attached by acting as a protective structure surrounding the stem portion.

In the preferred embodiment of the present invention, the shroud portion is molded as an integral part of the tube fitting. Moreover, the present invention accomplishes this while providing a sharp barbed edge along the stem portion, which is essential in reliably holding and sealing the tubing under pressure or vacuum conditions. In addition, the present invention provides for the presence of the shroud portion without substantially affecting the manufacturing cost of the tube fitting which is extremely important for allowing competiveness in a very cost-conscious marketplace.

The existence of two opposing openings in the shroud portion allows for a sharp barb to be molded in the stem portion, preferably directly in back of the tapered stem portion. The openings or windows are necessary to allow a mold element to form an undercut along the stem portion. In the preferred embodiment, the tapered stem portion is formed by a retractable core pin which provides a "parting line" free tapered stem portion as well as a fluid flow path through the stem portion of the miniature tube fitting.

In one embodiment of the present invention, the portion of the shroud encircling the tapered stem portion is formed by the retractable core pin. In yet another embodiment of the present invention, the shroud is largely formed by mold elements inserted through the windows of the shroud.

These and various other advantages and features of novelty which characterize the present invention are pointed out with particularity in the claims annexed hereto and forming a part hereof. However, for a better understanding of the invention, its advantages and objects obtained by its use, reference should be had to the drawings which form a further part hereof, and to the accompanying descriptive matter in which there is illustrated and described a preferred embodiment of the invention.

BRIEF DESCRIPTION OF THE DRAWINGS

FIGS. 1-13 were present in the parent application, while

In the drawings, in which like reference numerals and letters indicate corresponding parts throughout the several views, FIG. 1 is a view in perspective of a prior art multiple tube connector suitably mounted on a panel structure;

FIG. 2 is a view in perspective of yet another embodiment of a multiple tube connector mounted on a panel structure;

FIG. 3 is a perspective view of a preferred embodiment of the present invention with connector housings shown locked in abutting relationship and with a shroud member being partially removed to disclose the tubing interconnected to an end of a connector housing;

FIG. 4 is a view in perspective of a similar embodiment of the present invention with the connector housings being separated and with mounting lugs for mounting one of the connector housings on a panel structure being illustrated, one of the lugs being removed for sake of illustration;

FIG. 5 is a perspective view of the locking spindle of the embodiments shown in FIGS. 3 and 4;

FIG. 6 is a front end elevational view of the second connector housing shown in FIG. 3 including male tubing inserts;

FIG. 7 is a front end elevational view of the first connector housing shown in FIG. 3 including female tubing inserts and the spindle illustrated in FIG. 5, the spindle being positioned in the locked position;

FIG. 8 is a partial sectional view generally along the line 8—8 of FIG. 3;

FIG. 9 is a side elevational view of an embodiment of a male tubing insert;

FIG. 10 is a view similar to FIG. 9 of an embodiment of a female tubing insert;

FIG. 11 is an enlarged fragmentary sectional view illustrating interconnection of an alternate embodiment of a male tubing insert to a female tubing insert when the connector housings are in an abutting relationship;

FIG. 12 is an fragmentary elevational view of an embodiment of the connector housing mounted on a panel structure;

FIG. 13 is a sectional view as seen generally along line 13-13 of FIG. 12;

FIG. 14 is a view in perspective of an embodiment of a tube fitting in accordance with the principles of the present invention;

FIG. 15 is an enlarged sectional view of the embodiment illustrated in FIG. 14 while looking into one-half of the mold with fragmentary portions of mold elements being illustrated;

FIG. 16 is a view similar to FIG. 15 of an alternate arrangement of mold elements used to form a tube fitting in accordance with the principles of the present invention FIG. 17 is an alternate embodiment illustrating a T-shape fitting arrangement; and FIG. 18 is an alternate embodiment illustrating a tube fitting having stem portions at both ends which may be used to interconnect two pieces of tubing.

DETAILED DESCRIPTION OF THE PREFERRED EMBODIMENT

As noted, this application is a continuation-in-part of Ser. No. 658,271 filed Oct. 5, 1984. The detailed description referring to FIGS. 1-13 relates to the parent application.

Figure 1:
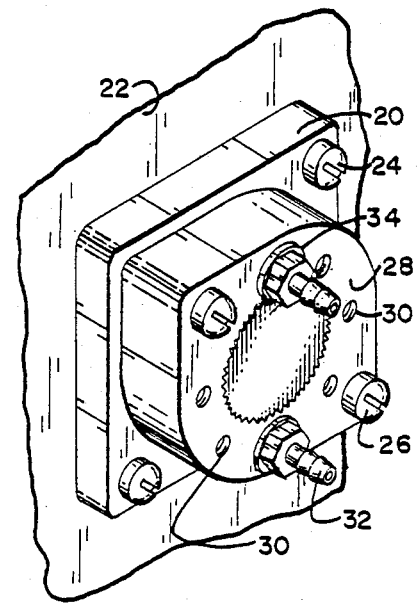
Figure 2:
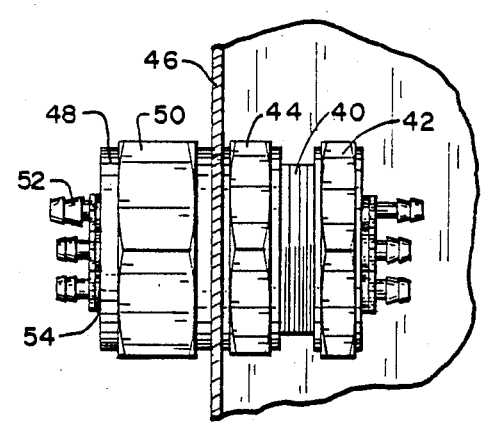

Referring now to the drawings, there is illustrated in FIGS. 1 and 2 examples of multiple tube connectors currently available in the marketplace. The first example shown in FIG. 1 is believed to be sold by Clippard Instrument Laboratory, in Cincinnati, Ohio. As illustrated in FIG. 1, this multiple tube connector includes a first panel-mounted housing portion 20 threadedly attached to a panel structure 22 by two threaded screws 24. Threadedly attached to the first panel-mounted portion 20 by threaded screws 26 is a second portion 28. A plurality of threaded apertures 30 are positioned generally about the circumference of the second portion and the first panel-mounted portion (not shown) so as to provide for fluid communication through the first and second portions 20, 28 when properly aligned with one another. Proper alignment is assured by the presence of a splined shaft (not shown) disposed on the side of the second portion 28 which cooperates with a keyed aperture (not shown) in the first panel-mounted portion 20. Disposed intermediate of the first and second portions 20, 28 to provide a fluid tight seal therebetween is a rubber gasket (not shown) so as to provide a fluid tight seal between the first and second portions. As illustrated in FIG. 1, threadedly inserted into the apertures 30 are barbed metal tubing inserts 32 for insertion into the ends of the tubing (there being two inserts in the embodiment shown). Each of the tubing inserts 32 include a corresponding seal member 34 for providing a fluid tight seal between the insert and the housing portion. Although not shown, the back side of the first panel-mounted portion 20 similarly includes threaded tubing inserts and their respective seals. It will be appreciated that there are numerous problems with the design shown in FIG. 1. For example, the housing portions 20, 28 are dissimilar in structure, with the first portion being constructed from a metal and the second portion being constructed from what is believed to be a plastic material. Furthermore, in order to disconnect the tubing, the screws 24 must be unthreaded to separate the housing portions 20, 28. Furthermore, when connecting the tubing, the screws 24 must be tightened an appropriate amount. It is very difficult to assure uniform tightness when using a threaded fastener as a threaded fastener provides no memory function in the fastening process. Additionally, each of the tubing inserts 32 must be threaded into the apertures 30 so as to be sealed by their individual seal members 34. Once again, this results in variable tightness and possibly in an ineffective seal. Furthermore, the small size of the parts makes it awkward and difficult to threadedly connect the inserts. In addition, the seals are not self-retaining and thereby can be easily lost. It will be appreciated that, in general, usage of such a multiple tube connector is time consuming and cumbersome and frequently does not result in a positive seal.

Illustrated in FIG. 2 is yet another embodiment of a commercially available multiple tube connector. As illustrated, the multiple tube connector includes a threaded cylindrical portion 40 having an enlarged, six sided hexagonal head portion 42 at one end thereof. A threaded nut portion 44 is threaded onto the cylindrical portion 40 such that when the cylindrical portion 40 is inserted into the opening of a panel structure 46, the first nut portion 44 can be threaded so as to abut against the panel structure 46. Releasably positioned at an opposite end of the cylindrical portion 40 is a cylindrical adaptor member 48 which is retained at the end of the cylindrical portion 40 by a second nut portion 50 threaded onto the cylindrical portion 40. While not shown, both the adaptor member 48 and the cylindrical portion 40 include a plurality of apertures therein. Proper alignment or keying of the apertures is provided by use of a dual pin structure on the end of the cylindrical portion 40 and a corresponding dual aperture structure at the end of the adaptor member 48. As illustrated, threadedly inserted into the threaded apertures are metal tubing inserts 52. As with the previously discussed multiple tube connector, this connector must be threaded and unthreaded to connect and disconnect the multiple tubing arrangement. Further, seals 54 must be provided between the adaptor member 48 and the cylindrical portion 40 as well as at each of the individual tubing inserts 52. As with the multiple tube connector of FIG. 1, it does not provide for a quick acting connect-/disconnect and oftentimes does not result in a good positive seal. Further, the relatively small size of the individual tubing inserts makes it difficult to threadedly insert them into their respective apertures. Also, as with the multiple tube connector discussed previously, the individual seals of the tubing inserts can be readily lost.

Figure 3:
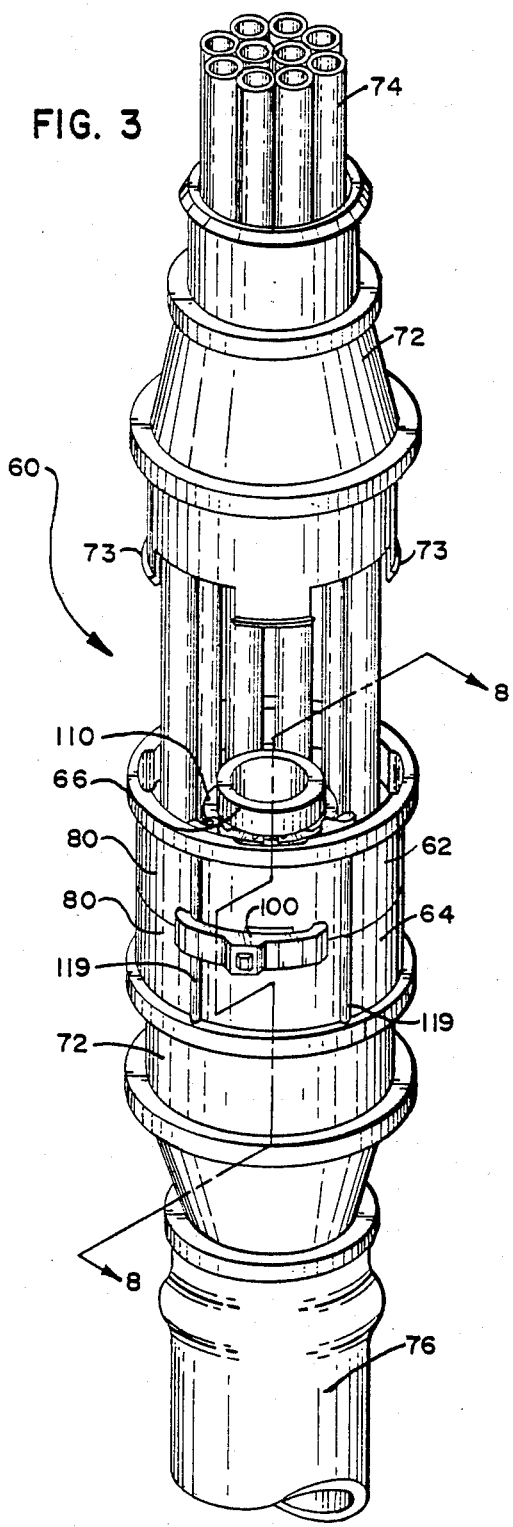
Figure 4:
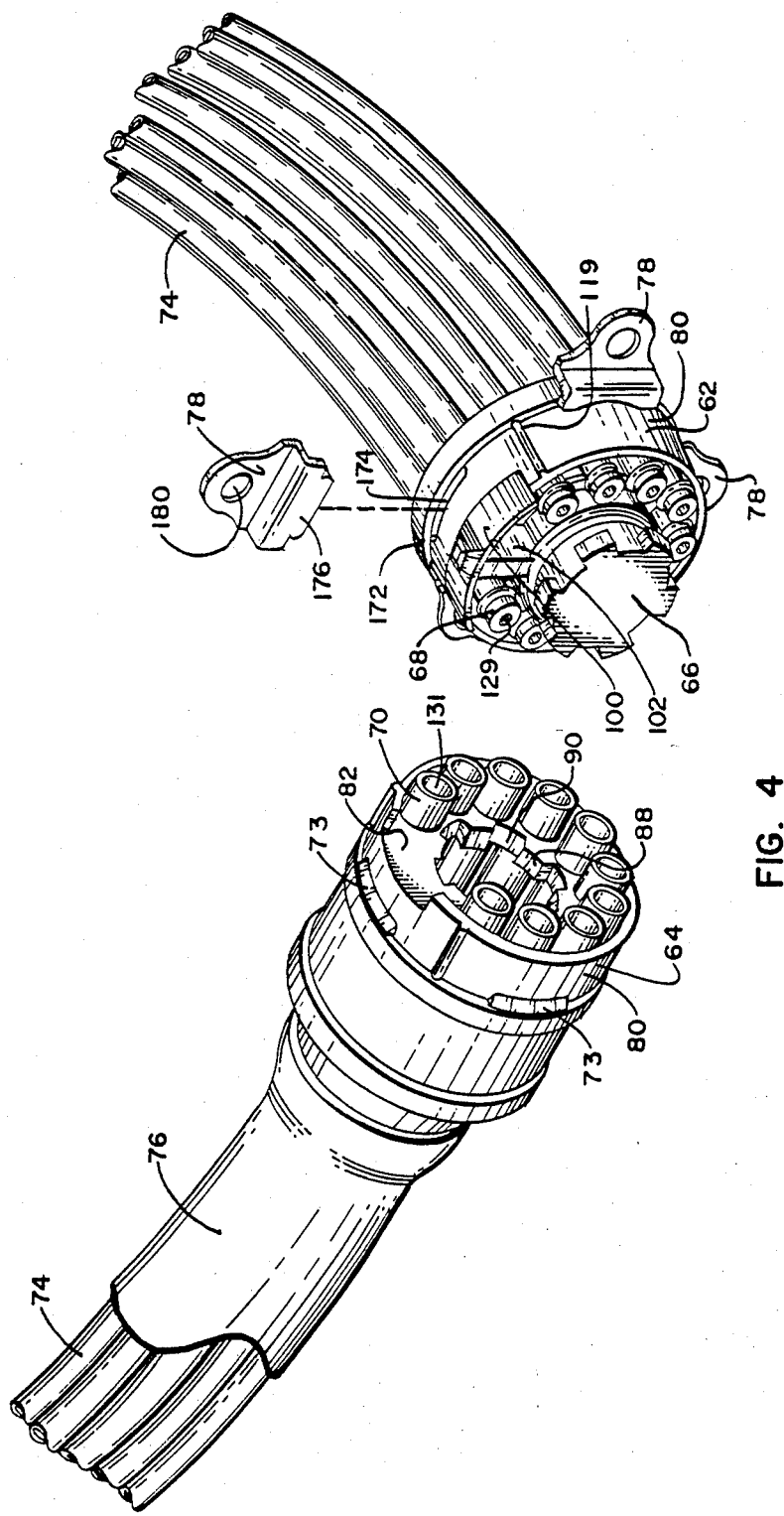
Figure 5:
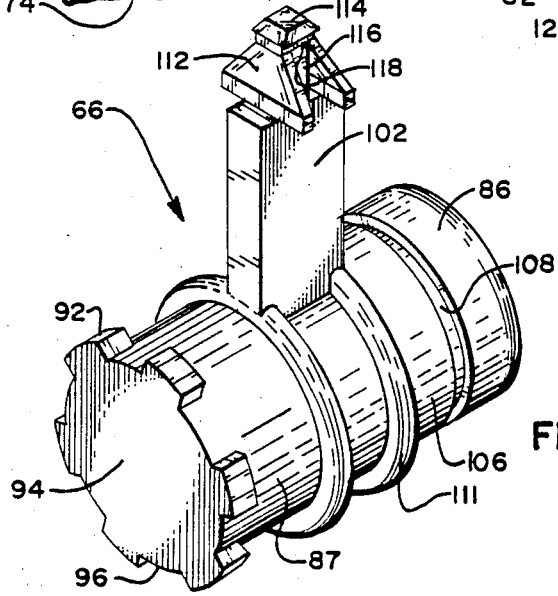

Illustrated in FIGS. 3 and 4 is a preferred embodiment of the multiple tube connector of the present invention, generally designated by the reference numeral 60. The preferred embodiment of the multiple tube connector 60 is illustrated as including substantially identical first and second connector housings 62, 64. As illustrated, the first connector housing 62 has a locking spindle member 66, an embodiment of which is illustrated in FIG. 5, rotatably mounted in an aperture 65. Although for sake of description the locking spindle 66 is described herein as being mounted in the first connector housing 62, it will be appreciated that the locking spindle member 66 might be rotatably mounted in the identical second connector housing 64. Furthermore, since the housings are substantially identical in the preferred embodiment shown, corresponding parts of the housings are designated herein by the same reference numerals. As illustrated in FIG. 4, removably mounted in apertures 67 of first and second connector housings 62, 64 are a plurality of male and female tubing inserts 68, 70. As illustrated in FIG. 4, the removable male tubing inserts 68 are positioned in the first connector housing 62 while in FIGS. 3, 6 and 8 the male tubing inserts 68 are positioned in the second connector housing 62. Thus, it will be appreciated that the male and female tubing inserts 68, 70 are interchangeable between the first and second connector housings 62, 64 and may even be intermixed within a given connector housing. Preferably, the locking spindle 66, the first and second housings 62, 64 and the inserts 68, 70 are each of one piece construction and constructed from a moldable material.

As illustrated in FIGS. 3 and 4, an optional shroud member 72 might be utilized to provide protection for a plurality of tubes 74 interconnected to the male and female tubing inserts 68, 70. In addition, as illustrated in FIGS. 3 and 4, the shroud member 72 might also provide for attachment of a flexible sheath 76 enclosing the tubes 74. Although not shown, a cable tie or clamp arrangement might be used to attach the flexible sheath to the shroud member 72. The shroud member 72 provides strain relief for the individual tubes when a tensile force is applied to the sheath 76 such as by pulling on the sheath 76. As shown in FIG. 3, the shroud 72 is removed from the first connector housing 62 to disclose the tubes 74 adjacent the end of the first connector housing 62. As further illustrated in FIG. 4, optional mounting lugs 78 might be utilized to mount one of the connector housings onto a panel structure. As illustrated a shroud member will typically not be attached to the connector housing when mounted on a panel structure.

More particularly, as disclosed in FIGS. 3 through 7, each of the first and second connector housings 62, 64 include an axially extending rim portion 80 interconnected to a transversely extending wall portion 82 disposed intermediate of the ends of the rim portion 80. Positioned in the wall portion 82 coaxially with respect to the rim portion 80 is the aperture 65 which is adapted to rotatably receive a first end portion 86 of a cylindrical body portion 87 of the locking spindle 66. The coaxial aperture 65 includes a plurality of inwardly projecting, evenly spaced apart and substantially identical splines 88 defining axially extending keyways 90 therebetween. The keyways 90 are adapted for slidable receipt of outwardly projecting, evenly spaced apart and substantially identical splines 92 located at a second end portion 94 of the cylindrical body portion 87 of the locking spindle 66, the splines 92 of the locking spindle 66 similarly defining axially extending keyways 96 therebetween. In the preferred embodiment shown, the first and second connector housings 62, 64 and the locking spindle 66 each include six identical evenly spaced apart splines. The splines are spaced apart and have a width of approximately thirty degrees. Accordingly, in the embodiment shown, by aligning the splines 92 of the locking spindle 66 with the keyways 90 of the second connector housing 64, the splines 92 of the locking spindle 66 can be inserted through and past the coaxial aperture 65 in the second connector housing 64 such that the connector housings 62, 64 are in an abutting relationship as generally illustrated in FIG. 3 and the male and female tubing inserts 68, 70 are interconnected as further illustrated in FIG. 8 thereby providing for fluid communication through the connector housings 62, 64 when in such an abutting relationship. By simply rotating the locking spindle 66 thirty degrees by use of a thumb pad 100 interconnected to a radially extending elongated shaft 102 of the locking spindle 66, the splines 92 of the locking spindle 66 are aligned with the splines 88 of the second connector housing 64 so as to prohibit removal of the spindle 66 and thus lock the first and second connector housings 62, 64 in the abutting relationship generally shown in FIG. 3. Similarly, the first and second connector housings 62, 64 are readily separated by movement of the thumb pad 100 approximately thirty degrees in the opposite direction and pulling the connector housings, 62, 64 apart. The motion of the thumb pad 100 is generally illustrated by the arrow 101 of FIG. 7.

As illustrated in FIGS. 3 through 7, in the preferred embodiment, ten of the apertures 67 of lesser diameter than the coaxial aperture 65 are positioned circumferentially in the wall portion 82 about the coaxial aperture 65. The wall portion 82 does not include any of the apertures 67 about a circumferential extent of approximately thirty degrees. Correspondingly, the rim portion 80 of the connector housings 62, 64 is cut away along a circumferential extent 106 so as to provide a range of movement of the elongated shaft 102 of the locking spindle 66 of approximately thirty degrees whereby the locking spindle 66 may be rotated by movement of the elongated shaft 102 between a first released position wherein the splines 92 of the locking spindle 66 are aligned with the keyways 90 of the second housing connector 64 and a second locked position wherein the splines 92 of the locking spindle 66 are aligned with the splines 88 of the second housing connector 64.

As illustrated in FIGS. 3 and 5, the locking spindle of the preferred embodiment includes a circumferentially extending groove 108 about the cylindrical body portion 87 which provides for receipt of a metal snap ring 110. The snap ring 110 cooperates with a raised ridge 111 or the cylindrical body portion 87 to retain the locking spindle 66 in the first connector housing 62. The outer diameter of the cylindrical body portion 87 between the snap ring 110 and the raised ridge 111 being slightly less than the diameter of the opening formed by the inner ends of the splines 88 so that the spindle 66 is rotatably mounted therein.

Figure 8:
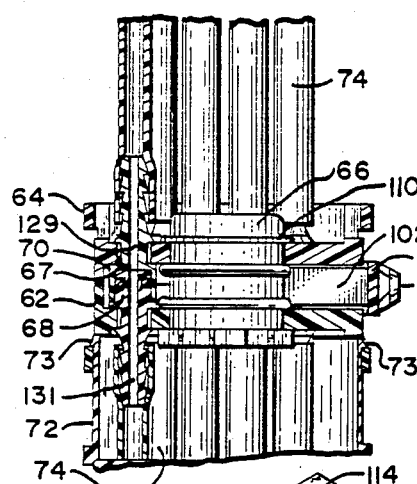

As illustrated in FIGS. 5 and 8, the elongated shaft 102 of the locking spindle 66 preferably includes tapered side portions 112 configured similarly to that of the thumb pad 100 and a rectangular member 114 supported on a pedestal portion 116 so as to provide an overhanging shoulder portion 118. The rectangular member 114 is configured to enable insertion of the thumb pad 100, which includes a corresponding aperture therein, over the rectangular member 114 such that the thumb pad 100 is retained by the overhanging shoulder portion 118 engaging a top surface of the thumb pad 100. Thus, during assembly, the thumb pad 100 may be readily snapped into position. In addition, in the preferred embodiment as illustrated in FIGS. 3 through 7, two radiused ridges 119 are provided to engage the downwardly biased ends 120 of the thumb pad 100 such that the locking spindle 66 is releasably retained in either the released or locked position. In addition, although not shown, the thumb pad 100 might be marked with the words "open" and "lock" and/or other suitable indicia indicating when the locking spindle is in the released position and when it is in the locked position. The radiused ridges 119 serve as detents for holding the thumb pad 100 in relation to the rim portion 80 of the connector housings such that the thumb pad 100 can be released by manually applying force to the thumb pad 100 in the direction of travel desired so as to slide the thumb pad 100 across the rim portion. It will be appreciated that numerous other designs for the switch mechanism in keeping with the principles of the present invention might be utilized.

Figure 9:
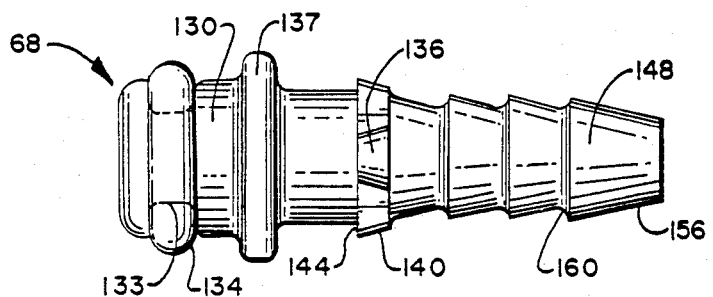
Figure 10:
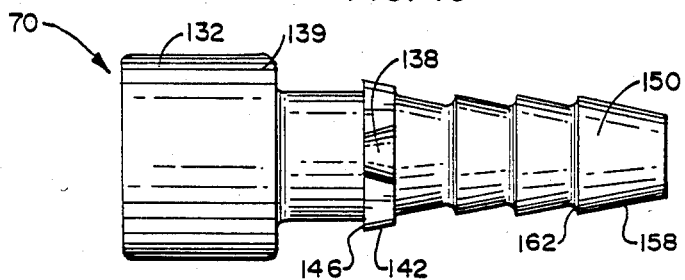

As illustrated in FIGS. 9 and 10, the male tubing insert 68 includes a first end 130 adapted for insertion into a first end 32 of the female tubing insert 70 when the first and second connector housings are in an abutting relationship. The male and female tubing inserts 68, 70 include axially extending bores 129, 131 therethrough so as to define a path for the flow of fluid therethrough. The first end 130 of the male tubing insert 68 includes a groove 133 adapted for receipt of an "O" ring 134 providing for a fluid tight seal between the male and female tubing inserts. In addition, the male and female tubing inserts 68, 70 include spaced apart outwardly projecting portions 136, 137 and 138, 139 respectively, for engaging the transverse wall portion 82 of the housing connector so as to removably retain the inserts in the connector housing. The portions 136, 138 are of only slightly greater diameter than the apertures 67 of the connector housings with one side 140, 142, of the portions 136, 138 being tapered so as to enable insertion of the inserts into the apertures 67 and one side 144, 146 being relatively flat for retaining the inserts in position once so inserted. In the embodiment shown, there are four each of the portions 136, 138 symmetrically disposed about the circumference of the inserts. As further illustrated, the diameter of the male and female inserts 68, 70 between the flange portions 136, 137 and 138, 139 respectively, is somewhat less than that of the aperture 67 such that when snapped into place, the male and female inserts 68, 70 are not rigidly mounted, but rather are capable of rotational movement and limited pivotal and lateral movement within the aperture 67 so as to facilitate alignment of the individual inserts. The "O" ring seals 134 are preferably self-retaining and replaceable.

Figure 11:
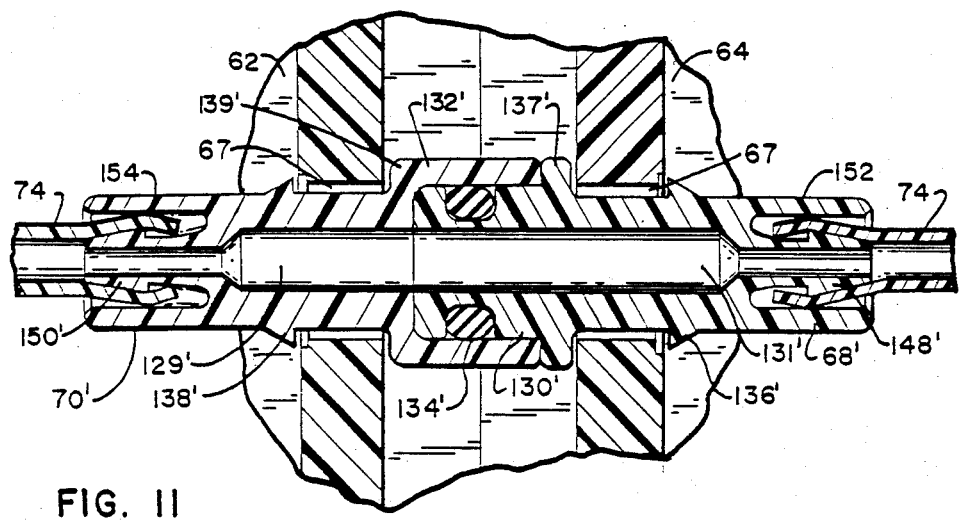

Second ends 148, 150 of the male and female tubing inserts 68, 70 are barbed and configured to be inserted into the end of the tubes 74. The second ends 148, 150 are provided with tapered head portions 156, 158 respectively, which are free of any seam or parting line and which include a radially extending shoulder portion 160, 162 forming a sharp corner for gripping the wall of the tubing. It will be appreciated that while the male and female tubing inserts 68, 70 might be manufactured by any number of methods, a core pin is typically utilized to do away with the seam or part line in the head portions 156, 158. In FIG. 11 wherein alternate embodiments of the male and female tubing inserts 68', 70' are illustrated (primed reference numerals indicating parts corresponding to the embodiments shown in FIGS. 9 and 10) the second ends have been modified to include an axially extending shroud portion 152, 154 radially spaced apart from and circumferentially surrounding the barbed second ends 148', 150'. As illustrated in FIG. 9, the spacing between the shroud portions 152, 154 and the barbed end portions 148', 150' is such that the wall of the tubing fits into this space. This embodiment is particularly advantageous in extremely small tubing such as 1/16th inside diameter tubing. The shroud portions 152, 154 provide support for the barbed ends 148', 150' which otherwise because of their relatively slight size have a tendency to kink or break. Although not shown, the shroud portions 152, 154 might include two diametrically opposed windows or gaps therein to facilitate the molding process.

It will be appreciated that male and female tubing inserts 68, 70 in accordance with the principles of the present invention might be made from varying materials to facilitate use with varying fluids and further might have varying sizes. For example, the male and female tubing inserts 68, 70 might be made of acetalplastic to provide substantial thermal and strength characteristics and average chemical characteristics. On the other hand, the inserts might be made from polypropylene to provide for increased resistance to chemical corrosion. Ideally, the first and second connector housings 62, 64 are made of glass filled nylon so as to provide suitable holding strength.

Figure 12:
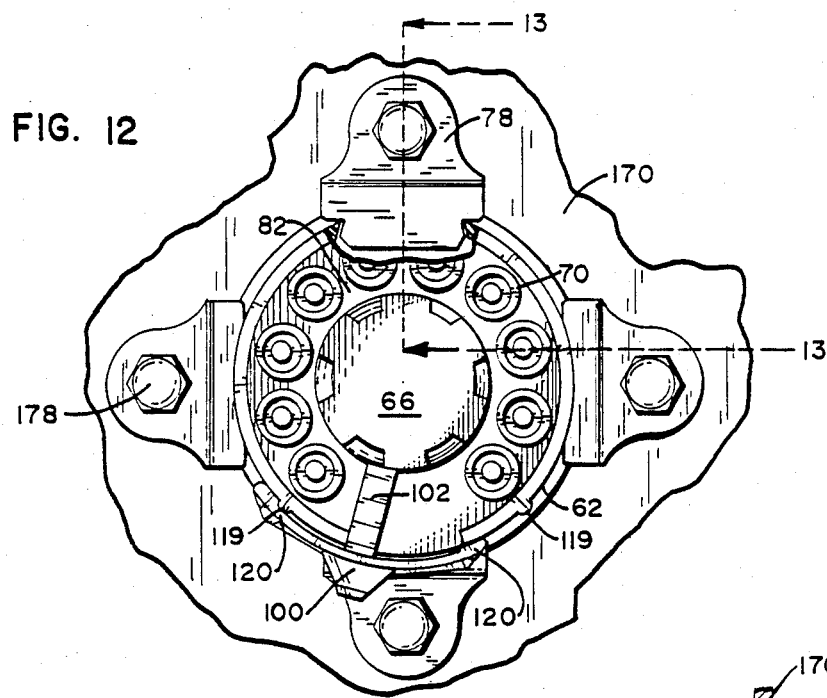
Figure 13:
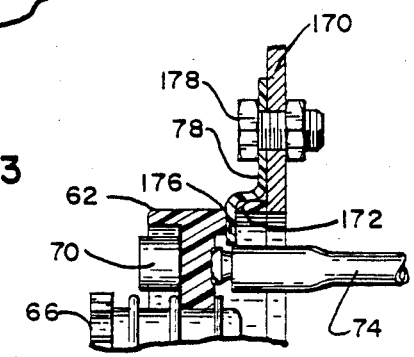

As illustrated in FIG. 3, the multiple tube connector 60 of the present invention might be utilized in a non panel-mounted configuration or, as illustrated in FIGS. 12 and 13, might be utilized in a panel-mounted configuration. As previously discussed, the connector housings are suitably mounted to a panel structure 170 by mounting lugs 78. The rim portion 80 of the connector housings includes an L-shaped flange 172. Diametrically positioned about the circumference of the rim portion are four elongated slots 174 adapted for receipt of an end portion 176 of the mounting lugs 78. As illustrated in FIG. 11, the connector housing is then attached to the panel structure 170 by a threaded fastener 178 inserted through an aperture 180 in the other end of the mounting lug 78.

The slots 174 of the rim portion 80 are also adapted to receive projections 73 of the shroud member 72 such that the shroud member 72 releasably snaps into place.

Figure 6:
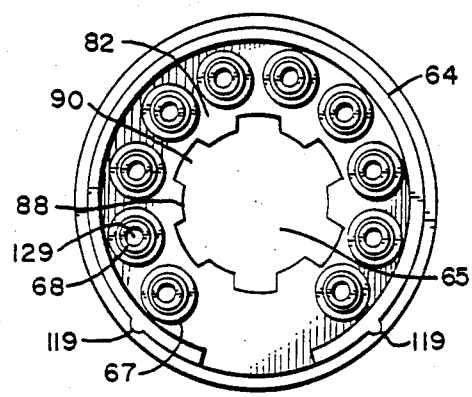
Figure 7:
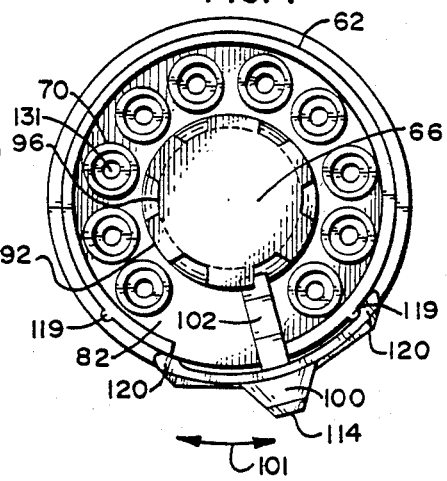

As illustrated in FIGS. 4, 6 and 7 the locking spindle 66 in connection with the first and second connector housings 62, 64 provides for a connector which is substantially symmetrical about its longitudinal axis such that uniform locking support is provided about the circumference of the connector. This is important in pressurized environments frequently encountered wherein pressures of one hundred p.s.i. are not uncommon. The symmetrical or balanced nature of the connector assures that the connector uniformly distributes the load applied by the internal forces of the tubing pressure.

In use, the first and second connector housings 62, 64 are readily connected and locked in an abutting relationship and disconnected by rotation of the locking spindle 66 a predetermined amount by use of the thumb pad 100. The locking mechanism of the present invention insures a quick positive lock with each use. Furthermore, quick uncoupling is accomplished by movement of the thumb pad 100 to the open position and then pulling the first and second connector housings 62, 64 apart. A particularly advantageous feature of the present invention is that proper keying or alignment is assured through cooperation of the locking spindle 66 with the first and second connector housings 62, 64. In addition, the arrangement of the tubing inserts 68, 70 assures proper balancing of the multiple tube connection. Further, the identical structure of the first and second connector housings 62, 64 reduces manufacturing costs and increases overall flexibility of the multiple tube connector. The male and female tubing inserts 68, 70 may be intermixed and replaced as desired with varying sizes and configurations capable of being used.

Figure 14:
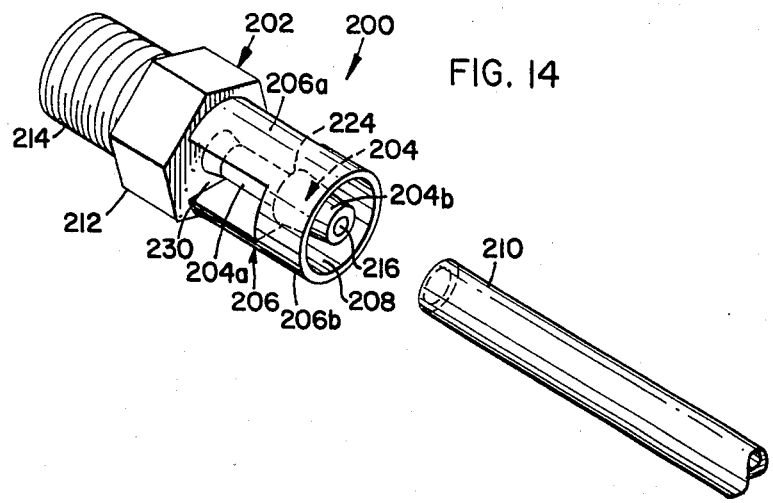
FIGS. 14-18 are newly added figures.

Illustrated in FIG. 14 is an embodiment of a miniature tube fitting in accordance with the principles of the present invention, the tube fitting being generally referenced by the reference numeral 200. The tube fitting of the present invention is particularly suited for use with miniature tubing; for example, tubing having diameters of 1/16 inch or so. The tube fitting 200 includes a molded body 202 having a first end with a stem portion 204 at least partially surrounded by a shroud portion 206 radially spaced outward from the stem portion 204 and defining an annular space 208 configured to receive a tube 210. The embodiment of the tube fitting shown includes a hexagonal portion 212 interconnecting the first end of the tube fitting to a threaded second end portion 214. The tube fitting 200 defines a fluid pathway 216 for the flow of fluid therethrough. It will be appreciated that the miniature tube fitting 200 may take on any number of fitting arrangement such as an elbow, T-shape, Y-shape, etc. Moreover, the tube fitting might include a stem portion at both ends such as when being used to interconnect two pieces of tubing or configurations other than the external threads at the second end portion 214.

In the embodiment illustrated, the stem portion 204 includes a generally cylindrical portion 204a and a tapered portion 204b. Formed immediately in back of or behind the tapered portion 204b is a transversely extending shoulder portion 224 which forms a sharp barb for gripping the tube 210 when the tube is inserted over the stem portion 204. The shroud portion 206 includes a first portion 206a including two diametrically opposed openings or windows 230 and a generally cylindrical second end portion 206b generally surrounding the tapered stem portion 204b. The two windows 230 enable mold elements to be inserted therethrough so as to undercut the tapered stem portion 204b and form the sharp barb 224.

Figure 15:
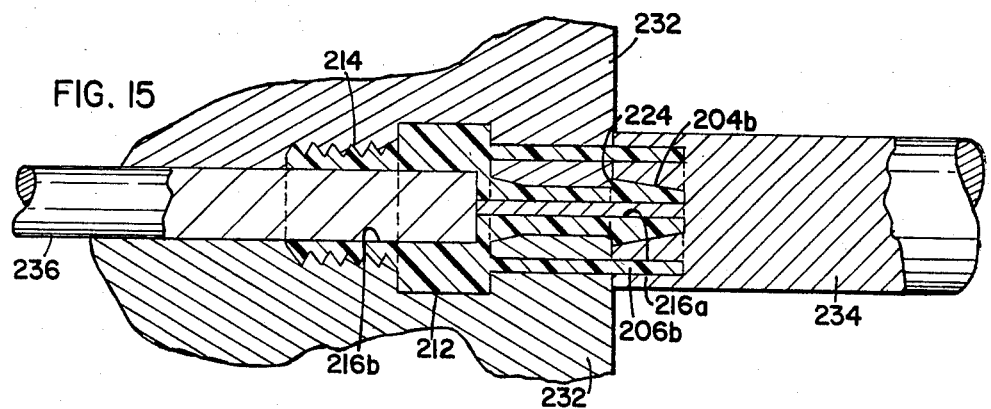

As illustrated in FIG. 15, in one embodiment of the present invention, the tube fitting is made by using a mold including two transversely, oppositely retractable, identical mold elements 232 (only one element 232 being shown in FIG. 15) which form the windows 230 and undercut the tapered stem portion 204b so as to form the sharp barb 224 as well as the threaded second end portion 214 and the hexagonal portion 212 of the tube fitting. FIG. 15 illustrates only-half of the mold, and thus only one of the mold elements 232 is shown. A second one of the mold elements 232 would form a second half of the tube fitting and be movable in a direction generally away and toward the plane of the drawing. A longitudinally retractable core pin mold element 234 forms the fluid pathway portion 216a, the tapered stem portion 204b, and the shroud portion 206b. A longitudinal retractable core pin 236 forms the fluid pathway portion 216b.

It will be appreciated that the tube fitting 200 can be formed using conventional molding temperature and pressure parameters and conventional materials such as thermoplastic materials which are suitable for molding purposes.

As indicated in the parent application, the principal feature of the present invention is the provision of the windows 230 in the shroud 206 which enables the tube fitting 200 of the present invention to be formed as an integral unit by conventional molding processes. The presence of the windows 230 enables the mold elements 232 to be positioned during the molding process so as to form the sharp barb 224.

In an alternate method of making the present invention, the entire shroud 206 is formed by mold elements 232' inserted through windows 230'. A retractable core pin mold element 234' does not form any portion of the shroud 206.

Figure 16:
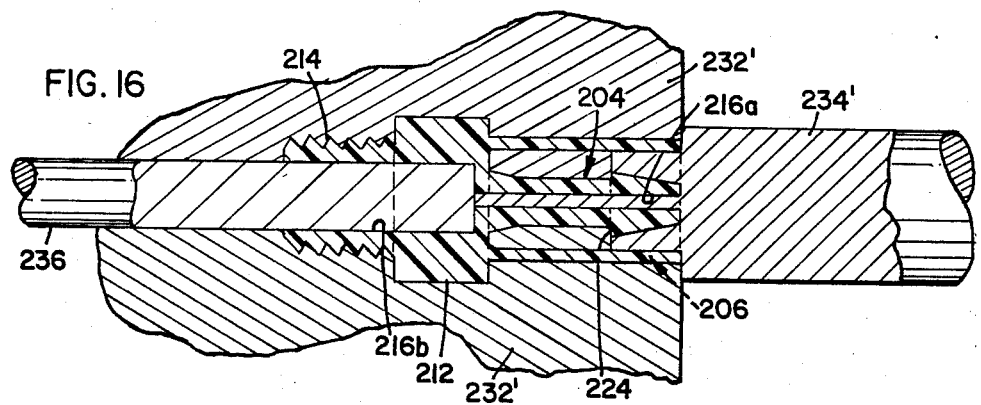
Figure 17:
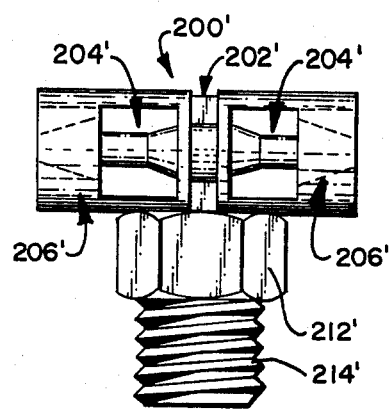
Figure 18:
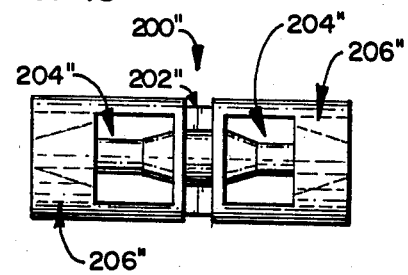

In both of the embodiments illustrated in FIGS. 15 and 16, the tapered stem portion 204b is free of any longitudinally extending "part line" which might otherwise interfere with a proper seal.

It is to be understood, however, that even though numerous characteristics and advantages of the invention have been set forth in the foregoing description, together with details of the structure and function of the invention, the disclosure is illustrative only, and changes may be made in detail, especially in matters of shape, size and arrangement of parts within the principles of the invention, to the full extent indicated by the broad general meaning of the terms in which the appended claims are expressed.

What is claimed is:

1. A molded tube fitting, comprising:
   (a) a body defining a first pathway for the flow of fluid therethrough;
   (b) a first end including a stem portion having a tapered stem portion adapted to be inserted into tubing defining a second pathway for the flow of fluid, the stem portion including barb means for gripping the interior of the tubing;
   (c) a shroud portion radially spaced apart from the stem portion and encircling at least a portion of the stem portion, the shroud being free from attachment with the stem portion along at least a portion of the stem portion and cooperating with the stem portion to define an annular space for receipt of the tubing, the shroud defining two windows enabling mold elements to be removably inserted therethrough so as to form the barb means along the stem portion; and
   (d) a second end for interconnection of the molded tube fitting to a third pathway for the flow of fluid, the first, second, and third pathways being in fluid communication.

2. A tube fitting in accordance with claim 1, wherein the tapered stem portion is free from a longitudinally extending part line.

3. A tube fitting in accordance with claim 1, wherein the windows are diametrically opposed.

4. A molded tube fitting in accordance with claim 1, wherein the second end is formed substantially as a hollow cylinder, the hollow cylinder having an inner surface and an outer surface, the inner surface being in communication the third pathway for the flow of fluid, the outer surface being threaded.

5. The molded tube fitting of claim 4, further comprising a middle portion, the middle portion being integrally formed between the first end and the second end, the middle portion being appropriately shaped so as to facilitate gripping of the middle portion by a rotation facilitating article.

6. The molded tube fitting of claim 5, wherein the middle portion is formed substantially as a hexagonal solid.

7. The molded tube fitting of claim 6, further comprising a plurality of first end portions, the plurality of first end portions permitting the attachment of a plurality of tubes to the molded tube fitting, the plurality of first end portions being joined at the middle portion of the molded tube fitting so as to define a single flow path, the single flow path fluidly merging with the pathway for the flow of the fluid extending through the second end portion of the molded tube fitting.

8. The molded tube fitting of claim 7, wherein the plurality of first end portions are oriented orthogonally to the second end portion, thereby creating a "tee" fitting.

9. The molded tube fitting of claim 1, wherein the stem portion includes a transversely extending shoulder portion, the shoulder portion being formed adjacent to the tapered portion, thereby forming a sharp barb used for gripping the tube.

10. The molded tube fitting of claim 4, wherein the second end is substantially identical to the first end, thereby forming a molded tube fitting having a stem portion at both the first and second ends.

11. A molded tube fitting, comprising:
(a) a body defining a first pathway for the flow of fluid therethrough;
(b) a first end including a stem portion having a tapered stem portion adapted to be inserted into tubing defining a second pathway for the flow of fluid, the tapered stem portion being free from a longitudinally extending part line, the stem portion including barb means for gripping the interior of the tubing;
(c) a shroud portion radially spaced apart from the stem portion and encircling at least a portion of the stem portion, the shroud being free from attachment with the stem portion along at least a portion of the stem portion and cooperating with the stem portion to define an annular space for receipt of the tubing, the shroud defining two windows enabling mold elements to be removably inserted therethrough so as to form the barb means along the stem portion; and
(d) a second end for interconnection of the molded tube fitting to a third pathway for the flow of fluid, the first, second, and third pathways being in fluid communication.

12. A molded tube fitting, comprising:
(a) a body defining a first pathway for the flow of fluid therethrough;
(b) a first end including a stem portion having a tapered stem portion adapted to be inserted into tubing defining a second pathway for the flow of fluid, the tapered stem portion being free from a longitudinally extending part line, the stem portion including a transversely extending shoulder portion, the shoulder portion being formed adjacent the tapered stem portion, thereby forming a sharp barb used for gripping the interior of the tubing;
(c) a shroud portion radially spaced apart from the stem portion and encircling at least a portion of the stem portion, the shroud being free from attachment with the stem portion along at least a portion of the stem portion and cooperating with the stem portion to define an annular space for receipt of the tubing, the shroud defining two windows enabling mold elements to be removably inserted therethrough so as to form the transversely extending shoulder portion; and
(d) a second end for interconnection of the molded tube fitting to a third pathway for the flow of fluid, the first, second, and third pathways being in fluid communication.

* * * * *